Nov. 2, 1948.   R. J. BURKHART   2,452,831
ANTISKID DEVICE
Filed Nov. 30, 1946

INVENTOR.
Robert J. Burkhart,
BY George D. Richards,
ATTORNEY.

Patented Nov. 2, 1948

2,452,831

UNITED STATES PATENT OFFICE 2,452,831

ANTISKID DEVICE

Robert J. Burkhart, Nutley, N. J.

Application November 30, 1946, Serial No. 713,207

2 Claims. (Cl. 152—224)

This invention relates to improvements in antislip devices or mud hooks for detachable application to automobile wheels.

The invention has for an object to provide a novel construction of anti-skid device or mud hook for the stated use which is provided with a U-shaped rigid tread plate adapted to substantially conform to the cross-sectional contour of an external peripheral portion of an automobile wheel tire, and which is of substantial width whereby to provide a considerable area of surface contact with the tire, said tread plate being provided with a plurality of laterally spaced, replaceable anti-slip elements which are detachably secured thereto for extension over the external face of the tread plate.

The invention has for another object to provide a non-chafing means for detachably securing the tread plate with its anti-slip elements to the automobile wheel and tire, said means including a fastening connection for coupling meeting ends of the securing means, in a manner adapted to draw said ends together, whereby to firmly and strongly tighten the securing means in place with the tread plate snugly and non-shiftingly embracing the tire of the automobile wheel.

The invention has for a further object to provide a novel form and construction of replaceable anti-slip elements for application to the tread plate, said tread plate having novel means to receive and firmly hold said applied anti-slip elements against lateral shifting or displacement relative thereto.

Other objects of this invention, not at this time more particularly enumerated, will be understood from the following detailed description of the same.

An illustrative embodiment of the invention is shown in the accompanying drawings, in which.

Similar characters of reference are employed in the hereinabove described views, to indicate corresponding parts.

Figure 1:
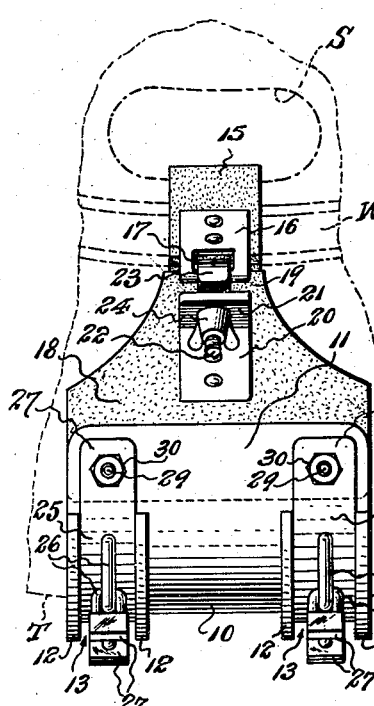
Fig. 1 is an end elevational view of the anti-slip device or mud hook as operatively applied to an automobile wheel and tire, fragmentary portions of the latter being shown by broken lines.
Figure 2:
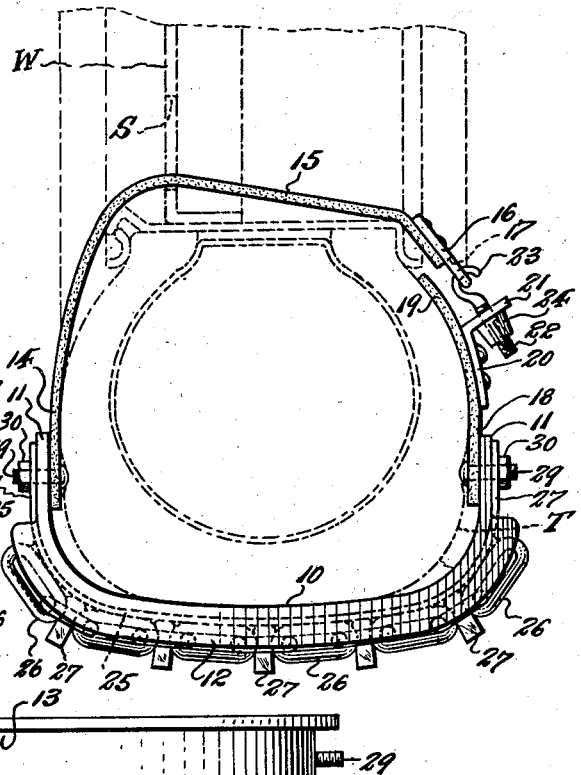
Fig. 2 is a side elevational view of the anti-slip device or mud hook as thus applied.
Figure 3:
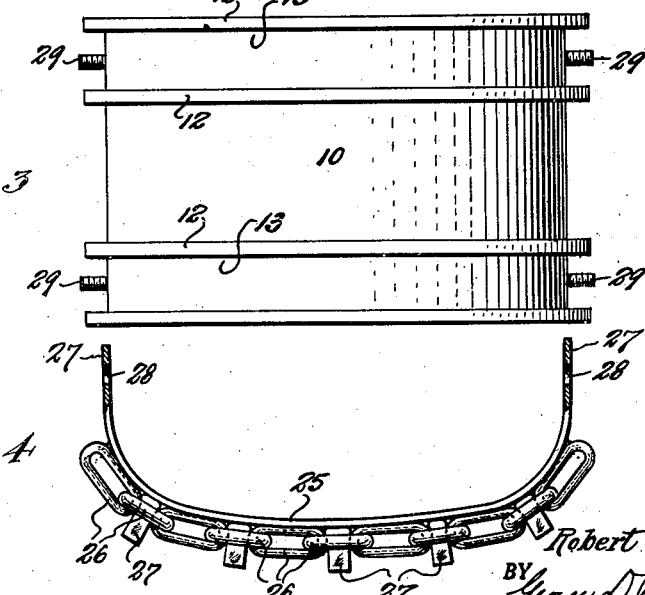
Fig. 3 is a bottom plan view of the tread plate of the anti-slip device or mud hook.
Figure 4:
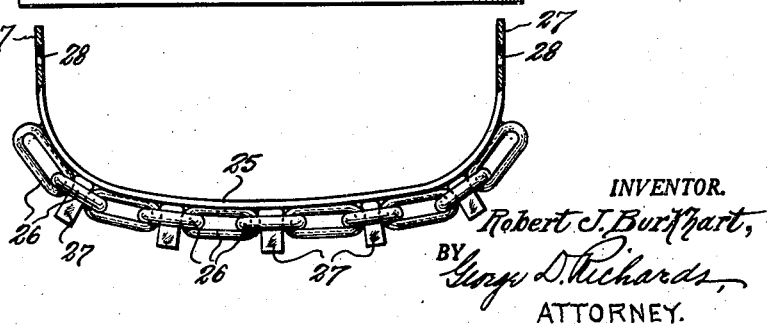
Fig. 4 is a side elevational view of a replaceable anti-slip element for attachment to said tread plate.

As illustratively shown in said drawings, the novel anti-slip device or mud hook according to this invention comprises a rigid, preferably metallic tread plate 10 of U-shape, whereby to terminate in end parts 11 which respectively embrace opposite side faces of an automobile wheel tire T, when the tread plate is applied across an external peripheral portion of the latter. Said tread plate is of substantial width so as to provide a considerable area of surface contact with the tire, and being of U-shape or arcuate form, said tread plate will snugly embrace the thus engaged surface of the tire.

Extending along the external face of the tread plate 10, substantially from end to end thereof, are pairs of laterally spaced externally projecting ribs 12—12; the ribs of each pair thereof define an intermediate receiving and seating channel 13. Said pairs of ribs are so relatively disposed as to be themselves laterally spaced one from the other. Although it is preferable to provide at least two said pairs of ribs 12—12 as shown, it will be obvious that more or less than two such pairs may be provided if desired.

Connected with one end portion 11 of the tread plate 10 is one part of a separable securing means by which the tread plate can be detachably connected with an automobile wheel and tire, said part of the securing means comprises a side wing section 14 of a width substantially corresponding to the width of the tread plate. Said side wing section is tapered so as to terminate in an attachment strap section 15 of substantially reduced width, whereby to permit its insertion through an opening or slot S in the automobile wheel W. Secured to the free end of said strap section 15 is an eye-plate 16, which is arranged to extend longitudinally therefrom. Said eye-plate 16 is preferably made of metal and is secured to the strap section end in any suitable manner, as e. g., by riveting the same thereto. Said eye-plate 16 is provided in its free end portion with an opening or eye 17. Said side wing section 14 is affixed in any suitable manner to the tread plate end portion, contiguous to the inner surface of the latter, to extend therefrom. The other part of said securing means comprises a like side wing section 18 of a width substantially corresponding to the width of the tread plate, and is affixed in any suitable manner to the opposite end portion of the latter, contiguous to the inner surface thereof, so as to extend therefrom. Said side wing section 18 is also tapered so as to terminate in a neck or tongue portion 19. Affixed to said neck or tongue portion 19, as e. g., by riveting the same thereto, is a metallic coupler plate 20 having an outwardly projecting perforate coupler lug or ear 21. Engaged through said lug or ear 21 is the threaded shank 22 of a coupler hook 23, which extends longitudinally outward therefrom for cooperation with said eye plate 16 of the strap section 15. Threaded onto said shank 22 is a thumb-nut 24 adapted to bear against the inner or rear face of said coupler lug or ear 21, and which is manipulatable for projecting and retracting said coupling hook 23. Said side wing sections 14 and 18 are preferably made of tough and flexible but substantially non-extensible material, such e. g. as textile fabric reenforced rubber sheeting, being therefore of non-abrasive character so as not to chafe the sides of a tire to which they are contiguous, when the anti-slip device or mud hook is applied and secured in operative relation to an automobile wheel and tire.

The replaceable anti-slip elements of the anti-slip device or mud hook each comprise a U-shaped metallic base strip 25 which conforms to the U-shape of the tread plate 10, and which are of a width to fit into a receiving and seating channel 13 intermediate a pair of ribs 12—12 of said tread plate, and of a length substantially corresponding to the length of said tread plate. Welded to the outer face of said base strip 25, to extend longitudinally along the latter intermediate its end portions, and so as to be unitary with said base strip, is a section of link chain 26, links of which include externally projecting calk-like formations 27', whereby to increase the traction grip of said chain when the anti-slip device or mud hook is in use. The respective ends of said chain 26 terminate short of the ends of the base strip 25, whereby to provide the latter with exposed free end portions 27. Each said end portion 27 is provided with an opening or eye 28.

To removably affix the anti-slip elements to the tread plate 10, end portions 11 of the latter are each provided with outwardly projecting screw-threaded studs 29 which are respectively disposed in aligned relation to the receiving or seating channels 13 adjacent to ends thereof, whereby to engage through the openings or eyes 28 of the base strips 25 of said anti-slip elements which are disposed in and extend through said channels 13. After the base strips 25 of the anti-slip elements are thus mounted on the exterior face of the tread plate and within the embrace of the receiving and seating channels 13, so that the studs 29 engage through said openings or eyes of the base strips, fastening nuts 30 are screwed onto said studs 29, whereby to secure the anti-slip elements in such operative assembled relation to the tread plate 10.

It will be apparent, that when assembled with and fixed to the tread plate 10 as above described, the chain and calk portions of the anti-slip elements will project from the external face of the tread plate, and will lie transverse to the circumferential tread periphery of the automobile wheel tire, whereby, in use, to effect a very strong ground gripping action calculated to assure positive tractional movement of the automobile wheel tire over mud, sand, snow or ice with which the surface traversed by the latter may be encumbered.

To apply the anti-slip device or mud hook to an automobile wheel and tire, the tread plate 10 is engaged across and so as to embrace the tire periphery, whereupon the strap section 15 of the securing means is passed outwardly through an opening or slot S in the wheel W, so as to oppose the eye-plate 16 to the coupler hook 23 of the opposite part of said securing means. The coupler hook adjusting thumb-nut 24 is turned outwardly on the coupler hook shank 22, so as to allow the hook 23 to be extended for easy manipulation, whereby to engage the same through the eye 17 of the eye-plate 16. After the hook 23 is thus engaged with the eye-plate, the thumb-nut 24 is screwed home against the lug or ear 21, whereby to retract the coupler hook 23 and thus draw tautly together the meeting ends of the securing means, thereby contracting the latter about the wheel and tire into strongly and snugly bound relation thereto, and so as to be firmly held against shifting or chafing movement during use of the anti-slip device or mud hook.

A marked advantage of my novel construction of anti-slip device or mud hook resides in the arrangement whereby the anti-slip elements are readily removable from the tread plate 10 merely by removing the fastening nuts 30, and detaching the ends of the base strips 25 from the studs 29. By reason of such detachability, it will be obvious that the anti-slip elements may be easily replaced when worn by new or spare elements.

Having now described my invention, I claim:

1. An anti-slip device comprising a rigid U-shaped tread plate to transversely embrace the periphery of an automobile wheel tire, said tread plate having means for securing the same to the wheel and tire, said tread plate having integral laterally spaced continuous radial ribs extending from end to end thereof to provide an intermediate receiving and seating channel, a conformably U-shaped metallic base-strip removably seated within said channel, a ground gripping link chain having certain links disposed in a plane perpendicular to the surface of said base-strip and welded thereto so as to be unitary therewith and alternate links disposed parallel to said base-strip, said latter links having calks outwardly projecting therefrom, and cooperative means between corresponding ends of said base-strip and tread plate for detachaby securing the former to the latter.

2. An anti-slip device comprising a rigid U-shaped tread plate to transversely embrace the periphery of an automobile wheel tire, said tread plate having means for securing the same to the wheel and tire, said tread plate having pairs of integral laterally spaced continuous radial ribs extending from end to end thereof respectively along its opposite side marginal portions, each pair of ribs providing a receiving and seating channel, a ground gripper means removably seated in each said channel, each ground gripper means comprising a U-shaped metallic base-strip, a ground gripping link chain having certain links disposed in a plane perpendicular to the surface of said base-strip and welded thereto so as to be unitary therewith and alternate links disposed parallel to said base-strip, said latter links having calks outwardly projecting therefrom, and cooperative means between corresponding ends of said base-strip and tread plate for detachably securing the former to the latter.

ROBERT J. BURKHART.

REFERENCES CITED

The following references are of record in the file of this patent:

UNITED STATES PATENTS

| Number | Name | Date |
|---|---|---|
| 1,253,740 | Smith | Jan. 15, 1918 |
| 1,419,680 | Maguire | June 13, 1922 |
| 1,687,701 | Weier | Oct. 16, 1928 |
| 2,053,953 | Kunz et al. | Sept. 8, 1936 |
| 2,244,218 | Rollings | June 3, 1941 |

FOREIGN PATENTS

| Number | Country | Date |
|---|---|---|
| 37,566 | Denmark | June 7, 1927 |